(12) United States Patent
Kondo et al.

(10) Patent No.: US 8,355,166 B2
(45) Date of Patent: Jan. 15, 2013

(54) IMAGE-PRINTING DEVICE WITH IMAGE CORRECTION OF AN ORIGINAL IMAGE USING CHARACTERISTICS OF A SAMPLE IMAGE

(75) Inventors: Masaki Kondo, Toyoake (JP); Kiyoji Muramatsu, Kasugai (JP); Tomohiko Hasegawa, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 532 days.

(21) Appl. No.: 12/164,772

(22) Filed: Jun. 30, 2008

(65) Prior Publication Data

US 2009/0002738 A1 Jan. 1, 2009

(30) Foreign Application Priority Data

Jun. 29, 2007 (JP) ................................. 2007-173458

(51) Int. Cl.
*G06F 15/00* (2006.01)
(52) U.S. Cl. ........................................ 358/1.9; 358/1.13
(58) Field of Classification Search ......................... None
See application file for complete search history.

(56) References Cited

U.S. PATENT DOCUMENTS

| | | | | |
|---|---|---|---|---|
| 5,874,988 A * | 2/1999 | Gu | ................................. | 348/97 |
| 5,987,222 A * | 11/1999 | Terashita | ....................... | 358/1.9 |
| 6,069,982 A * | 5/2000 | Reuman | ........................ | 382/275 |
| 6,229,580 B1 | 5/2001 | Inoue | | |
| 7,016,075 B1 | 3/2006 | Tsukada | | |
| 2001/0028736 A1* | 10/2001 | Pettigrew et al. | ............. | 382/162 |
| 2004/0135790 A1 | 7/2004 | Moore | | |
| 2004/0165769 A1* | 8/2004 | Huh et al. | ..................... | 382/162 |
| 2007/0070436 A1 | 3/2007 | Iwaki | | |
| 2007/0177029 A1* | 8/2007 | Wada et al. | ................ | 348/222.1 |

FOREIGN PATENT DOCUMENTS

| | | |
|---|---|---|
| EP | 0 604 758 A1 | 7/1994 |
| EP | 0 891 078 A2 | 1/1999 |
| EP | 1 648 159 A1 | 4/2006 |
| GB | 2 208 460 A | 3/1989 |
| JP | Hei 9-51420 | 2/1997 |
| JP | 2001-092956 | 4/2001 |
| JP | 2001-160908 | 6/2001 |

(Continued)

OTHER PUBLICATIONS

Extended European Search Report dated Oct. 28, 2011 from related application EP 08252225.1-1522.

*Primary Examiner* — Twyler Haskins
*Assistant Examiner* — Christopher D Wait
(74) *Attorney, Agent, or Firm* — Scully, Scott, Murphy & Preseer, P.C.

(57) ABSTRACT

An image-printing device includes a reading unit, a sample characteristic amount extracting unit, an original characteristic amount extracting unit, an image converting unit, and a printing unit. The reading unit reads a sample image and an original image. The sample image has a sample characteristic amount indicating a characteristic of the sample image. The original image has an original characteristic amount indicating a characteristic of the original image. The sample characteristic amount extracting unit extracts the sample characteristic amount from the sample image. The original characteristic amount extracting unit extracts the original characteristic amount from the original image. The image converting unit converts the original image based on both the sample characteristic amount and the original characteristic amount. The printing unit prints the converted original image.

24 Claims, 9 Drawing Sheets

CORRECTION CURVE SMOOTHED BETWEEN COLOR SEGMENT 1 AND COLOR SEGMENT 2

FOREIGN PATENT DOCUMENTS

| | | |
|---|---|---|
| JP | 2002-171408 | 6/2002 |
| JP | 2003-216948 | 7/2003 |
| JP | 2004-064198 | 2/2004 |
| JP | 2005-197996 | 7/2005 |
| JP | 2005-262710 | 9/2005 |
| JP | 2006-80746 | 3/2006 |
| JP | 2007-089179 A | 4/2007 |
| JP | 2007-118221 | 5/2007 |

* cited by examiner

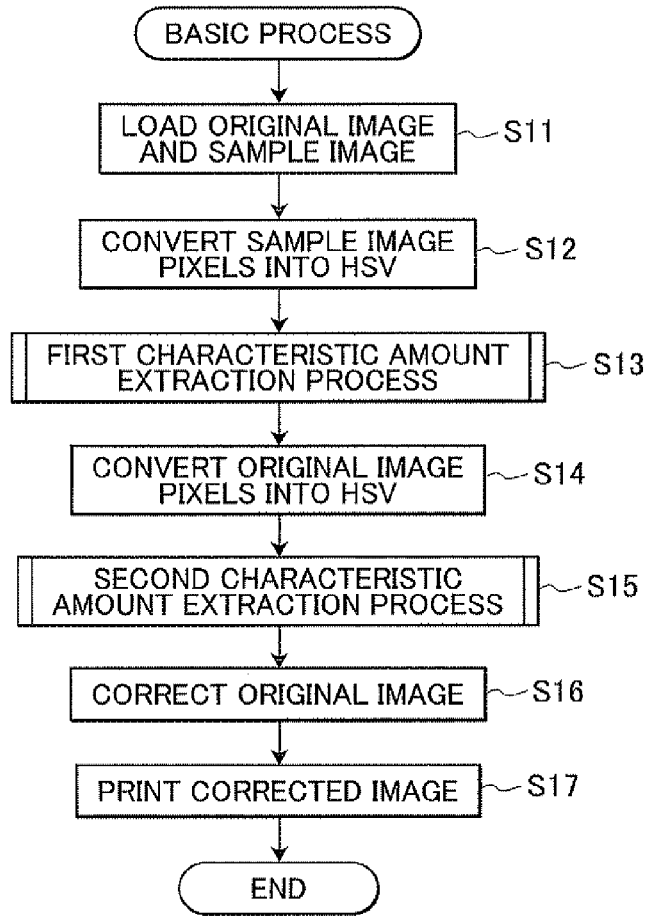
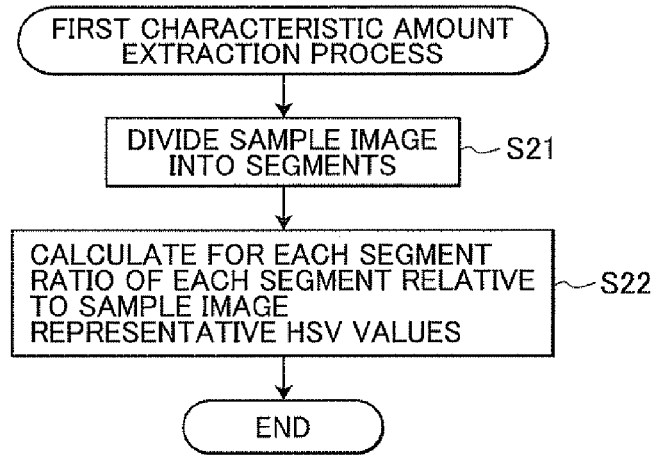

HUE CORRECTION TABLE

COLOR SEGMENT 1   COLOR SEGMENT 2
CORRECTION CURVE SMOOTHED
BETWEEN COLOR SEGMENT 1 AND
COLOR SEGMENT 2

FIG.15
CALCULATION OF Sc'
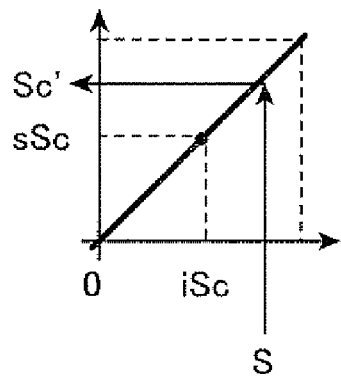
CALCULATION OF Sb'
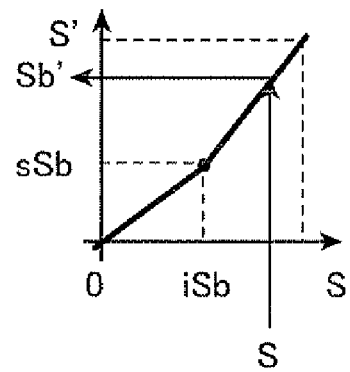
FIG.16
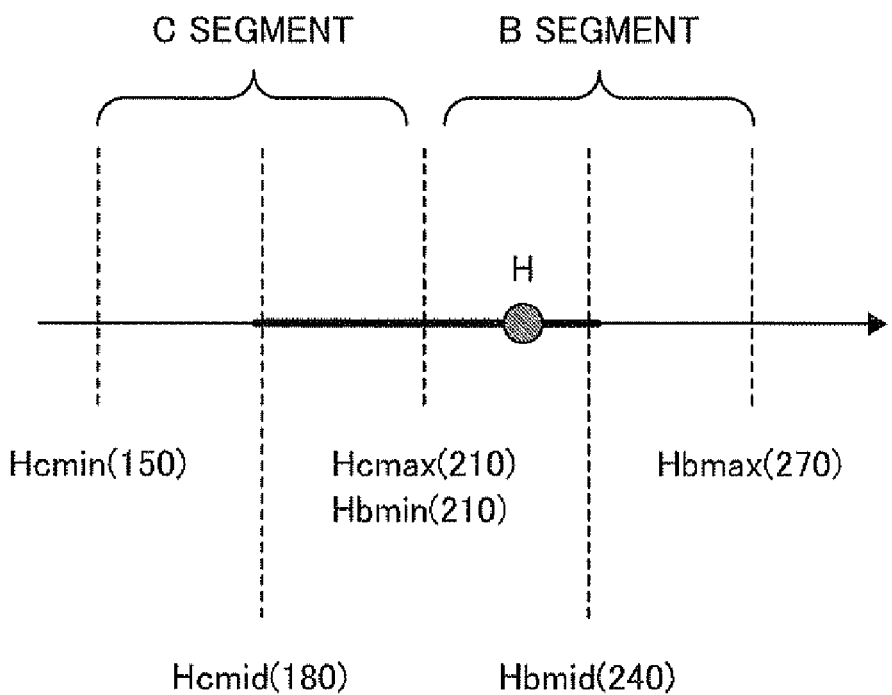

IMAGE-PRINTING DEVICE WITH IMAGE CORRECTION OF AN ORIGINAL IMAGE USING CHARACTERISTICS OF A SAMPLE IMAGE

CROSS REFERENCE TO RELATED APPLICATION

This application claims priority from Japanese Patent Application No. 2007-173458 filed Jun. 29, 2008. The entire content of each of these priority applications is incorporated herein by reference.

TECHNICAL FIELD

The present invention relates to an image printing device which allows a user to correct an image with simple operation.

BACKGROUND

Along with the popularization of digital cameras and other related products, more and more people are enjoying capturing images and printing the captured images by a home printing device. People also prints images stored in a storage medium, using a home printing device. If the captured images do not have an intended color tone, a color conversion process is desired for the images before printing.

A printing device capable of adjusting an image is disclosed in Japanese Patent Application Publication No. 2007-89179. This printing device requires a user to input adjustment data thereto for adjusting the quality of an acquired image.

SUMMARY

Since the printing device requires specific data to be inputted thereto for image adjustment, the user has to be knowledgeable about image processing. If the user does not have the knowledge about the image processing, the user cannot make image adjustment in a visual form. Furthermore, no description is given for the printing device, about the image adjustment to be made to a specific segment. In addition, the user has to make selections or settings for the inputted adjustment data. This operation is not easy to the user.

In the view of the forgoing, it is an object of the present invention to provide an image-printing device which allows a user to make color conversion according to the user's preference with simple operation.

In order to attain the above and other objects, the present invention provides an image-printing device including a reading unit, a sample characteristic amount extracting unit, an original characteristic amount extracting unit, an image converting unit, and a printing unit. The reading unit reads a sample image and an original image. The sample image has a sample characteristic amount indicating a characteristic of the sample image. The original image has an original characteristic amount indicating a characteristic of the original image. The sample characteristic amount extracting unit extracts the sample characteristic amount from the sample image. The original characteristic amount extracting unit extracts the original characteristic amount from the original image. The image converting unit converts the original image based on both the sample characteristic amount and the original characteristic amount. The printing unit prints the converted original image.

Another aspect of the present invention provides an image-printing method of correcting an original image for printing. The image-printing method includes steps (a)-(e). The step (a) reads the sample image and an original image. The sample image has a sample characteristic amount indicating a characteristic of the sample image. The original image has an original characteristic amount indicating a characteristic of the original image. The step (b) extracts the sample characteristic amount from the sample image. The step (c) extracts the original characteristic amount from the original image. The step (d) converts the original image based on both the sample characteristic amount and the original characteristic amount. The step (e) prints the converted original image.

Another aspect of the present invention provides a computer readable medium storing an image-printing program. The computer readable medium includes steps (a)-(e). The step (a) reads the sample image and an original image. The sample image has a sample characteristic amount indicating a characteristic of the sample image. The original image has an original characteristic amount indicating a characteristic of the original image. The step (b) extracts the sample characteristic amount from the sample image. The step (c) extracts the original characteristic amount from the original image. The step (d) converts the original image based on both the sample characteristic amount and the original characteristic amount. The step (e) prints the converted original image.

BRIEF DESCRIPTION OF THE DRAWINGS

The particular features and advantages of the invention as well as other objects will become apparent from the following description taken in connection with the accompanying drawings, in which:

FIG. 4 is a flowchart showing the color conversion process according to a first embodiment;

FIG. 5 is a flowchart showing a process of extracting a first characteristic amount;

FIG. 15 shows corrected S values in the B and C segments; and

FIG. 16 shows a case in which the B and C segments are partially converted.

DETAILED DESCRIPTION

First Embodiment

Figure 1:
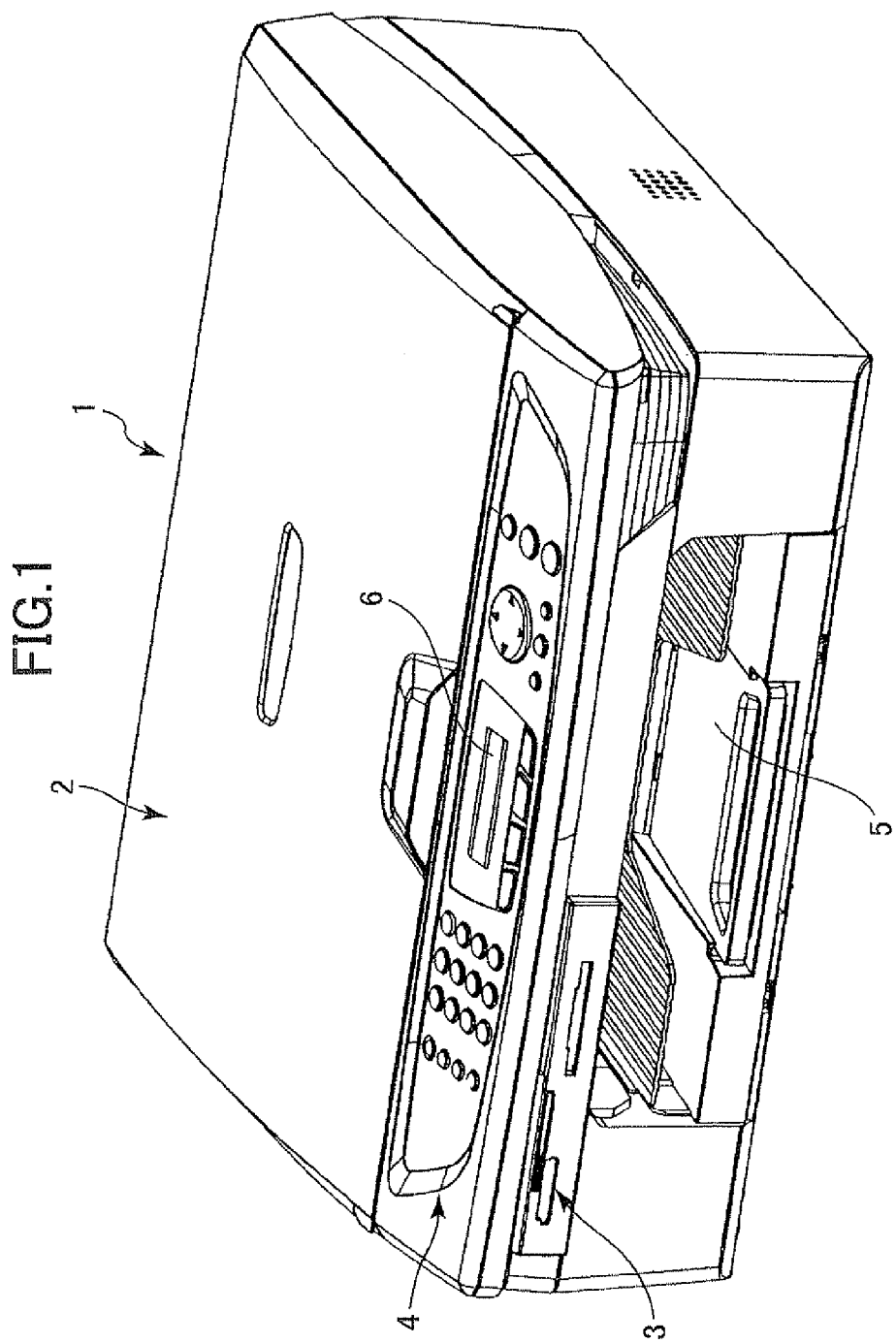
FIG. 1 shows an appearance of an image-printing device.
Figure 2:
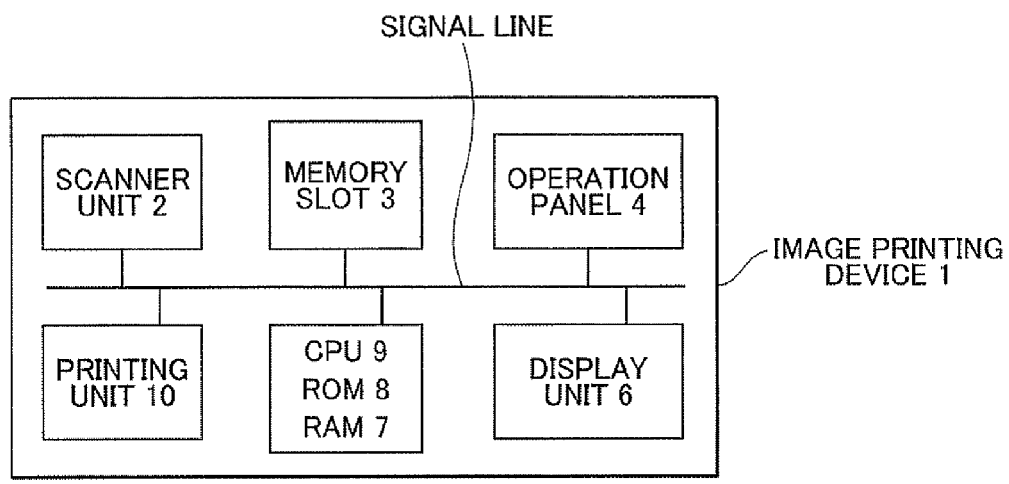
FIG. 2 shows an inner configuration of an image-printing device.

FIG. 1 shows an exemplary appearance of the image-printing device according to the present invention. FIG. 2 shows an exemplary inner configuration of an image printing device 1.

The image-printing device 1 is an exemplary multi-functional printer. The image-printing device 1 includes a scanner unit 2 provided on the top thereof, for reading image data from a photograph or the like. (FIG. 1 is given in a state that the cover of the scanner is closed.) The image data read by the scanner is used as sample information so that the colors of the image data loaded through a memory slot are converted. This image conversion process is described later in detail.

The image-printing device 1 further includes a memory slot 3. The memory slot 3 works as an IC card reader for reading image data stored in an external memory which is a recording medium such as an SD card (trademark) or a CF card trademark). The external memory (storage medium) is selectable among known mediums and types as required. The image-printing device 1 can include a plurality of memory slots to support plural types of mediums. Alternatively, a communication function allowing the connection to a network such as LAN, to which a PC storing image data is connected, (for example, LAN card, not shown) can be added to the signal line shown in FIG. 2, to which a CPU, a ROM, a RAM, and the like are connected. This configuration allows the image-printing device 1 to read intended image data through the network connected to the PC, instead of reading from the external memory. In this case, the image-printing device 1 has a communication function. The image-printing device 1 further includes an operation panel 4 for allowing the user to perform various kinds of operations.

The image-printing device 1 further includes a printing unit 10 as shown in FIG. 2. The color-converted image data is printed by the printing unit 10. The sheet on which the image data is printed is discharged, for example, through a discharge slit 5.

The image-printing device 1 further includes a display unit 6 to display various kinds of textual and image information. The image-printing device 1 is controlled by a processor (CPU 9) as a whole. The image-printing device 1 further includes a ARM 7 for storing information temporarily; and a ROM 8 which stores predetermined information. The image-printing device 1 can further include a mass storage device such as a HDD as required.

The foregoing constituent elements are connected to each other through the signal line. Furthermore, various functions (including facsimile function) can be added to the image-printing device 1. The image-printing device 1 can further include an interface which allows the connection to a personal computer or the like, and an interface which allows the connection to another printing device.

The present invention is not limited to the shown appearance. Although the appearance is based on the device in which all the available functions are integrated into one, one or more of the functions can be implemented by an external device. Furthermore, the present invention is not limited to the shown inner configuration.

Figure 3:
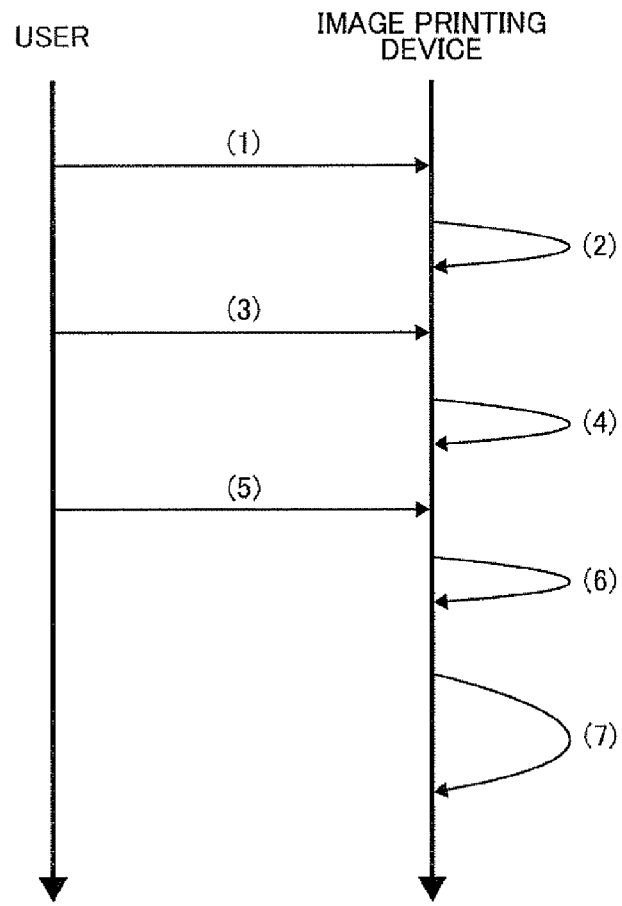
FIG. 3 outlines an interaction between a user and the image-printing device in a color conversion process.

Next, in a color conversion process to be performed by the image-printing device 1 according to the present invention, the interaction between the user and the device is outlined. FIG. 3 outlines the color conversion process. First, a user sets a memory in the memory slot of the image-printing device, in a state that an image to be color-converted is stored in the memory. As the memory, a known storage medium such as a memory card can be employed.

As the user sets the memory in the memory slot 3 (1), the image-printing device recognizes the set memory. The image-printing device then allows the user to select an image to be color-converted, from the images stored in the memory (2). In order to select an image, known techniques can be employed as appropriate. For example, the image-printing device can display one image after another to allow the user to make the selection. The display unit 6 can also be used for this purpose.

As the user decides which image is to be color-converted (3), the image-printing device loads the selected image into a RAM or the like (4). Hereinafter, the selected image is referred to as an "original image"

Next, the user places an image on the scanner as a sample for the image color conversion (hereinafter, the placed image is referred to as a "sample image") (5). As the user depresses a predetermined button or the like, the image-printing device loads the sample image into the RAM 7 or the like (6).

After that, the image-printing device performs a process to be described later both on the image read by the scanner and on the image read from the memory (7).

In the process shown in FIG. 3, the original image is first loaded from the memory, and the sample image is then loaded by the scanner. However, the sample image can be loaded by the scanner first so that the original image is then loaded from the memory.

Next, the color conversion process according to the image-printing device is described. FIG. 4 is a flowchart outlining a basic process in this embodiment.

In S11, the CPU 9 loads the original image and the sample image into the PAM 7 of the image-printing device 1. In this case, the loaded images are not limited to a specific format.

In S12, the CPU 9 converts each pixel of the loaded sample image into HSV parameters. If the sample image is created based on RGB color system, the CPU 9 converts the sample image into HSV parameters based on the following known technique:

(1) Equation for Converting from RGB to HSV

The expression "max(a, b, c)" means the maximum value among a, b, and c.

The expression "min(a, b, c)" means the minimum value among a, b, and c $$V=\max(R/255, G/255, B/255)$$

Where V is not equal to 0, $$S=(V-\min(R,G,B))\div V.$$

Where V is equal to 0, $$S=0$$

Where $(V-\min(R,G,B))$ is not equal to 0, $$r=(V-R/255)\div(V-\min(R,G,B));$$

$$g=(V-G/255)\div(V-\min(R,G,B));\text{ and}$$

$$b=(V-B/255)\div(V-\min(R,G,B)).$$

Where $\{V-\min(R,G,B)\}$ is equal to 0, $$r=0;$$

$$g=0;\text{ and}$$

$$b=0.$$

Where V=R/255, $$H=60\times(b-g).$$

Where V=G/255, $$H=60\times(2+r-g).$$

Where V=B/255, $$H=60\times(4+g-r).$$

However, where H<0, $$H=H+360.$$

On the other hand, the CPU 9 converts HSV parameters into RGB parameters based on the following known technique:

(2) Equation for Converting from HSV to RGB (The parameters "in", "fl", "m", and "n" are used for calculating RGB parameters from HSV parameters)

The expression "in" means the integer portion of (H/60).
The expression "fl" means the fractional portion of (H/60).
Where in is an even number, $$H=1-fl;$$

$$m=V\times(1-S); \text{ and}$$

$$n=V\times(1-S\times H).$$

Where in is equal to 0, $$R=V\times 255;$$

$$G=n\times 255; \text{ and}$$

$$B=m\times 255.$$

Where in is equal to 1, $$R=n\times 255;$$

$$G=V\times 255; \text{ and}$$

$$B=m\times 255.$$

Where in is equal to 2, $$R=m\times 255;$$

$$G=V\times 255; \text{ and}$$

$$B=n\times 255.$$

Where in is equal to 3, $$R=m\times 255;$$

$$G=n\times 255;$$

$$B=V\times 255.$$

Where in is equal to 4, $$R=n\times 255;$$

$$G=m\times 255; \text{ and}$$

$$B=V\times 255.$$

Where in is equal to 5, $$R=V\times 255;$$

$$G=m\times 255; \text{ and}$$

$$B=n\times 255.$$

In S13, based on the HSV parameters, the CPU 9 extracts a first characteristic amount as the characteristic amount of the sample image. The process of extracting the first characteristic amount will be described later in detail.

In S14, the CPU 9 converts each pixel of the loaded original image into HSV parameters. In S15, based on the HSV parameters, the CPU 9 extracts a second characteristic amount as the characteristic amount of the original image. The process of extracting the second is characteristic amount will be described later in detail.

In S16, the CPU 9 corrects the original image based on the first and second characteristic amounts. The correction process will be described later in detail. In S17, the CPU 9 prints out the corrected original image.

In the foregoing process, the CPU 9 extracts the first characteristic first, and then the second characteristic amount. However, the CPU 9 can extract the second characteristic amount firsts and then the first characteristic amount. Furthermore, the CPU 9 can extract L*c*h*parameters instead of HSV parameters. Other types of known parameters including RGB parameters are applicable to the present invention. Hereinafter, a description is given for a case in which the CPU 9 extracts RSV parameters.

The process of extracting the first characteristic amount shown as S13 is described with reference to FIG. 5. FIG. 5 is a flowchart showing the first characteristic amount extraction process. Hereinafter, an H value is defined to be −30 or larger and smaller than 330. If the H value does not fall within this range, the CPU 9 adjusts the H value to fall within the range by converting the H value (for example, "H value+360*n" or "H value−360", n=integer).

In S21, the CPU 9 divides the sample image into a plural number of segments. In this case, the division is made based on the commonly-employed six hues. Specifically, the CPU 9 divides the sample image based on the H value of each pixel.

R segment: −30 or larger and smaller than 30
Y segment: 30 or larger and smaller than 90
G segment: 90 or larger and smaller than 150
C segment: 150 or larger and smaller than 210
B segment: 210 or larger and smaller than 270
M segment: 270 or larger and smaller than 330

In this case, the correspondence between the segments and the H values is given as an example. The correspondence can be changed as required.

In S22, the CPU 9 calculates the "ratio of each segment relative to the sample image" and the "representative values (HSV values) of each segment" for each of the segments divided in S21. Hereinafter, the representative values (HSV values) of each segment are defined as follows:

The representative values of R segment: sHr, sSr, and sVr
The representative values of G segment: sHg, sSg, and sVg
The representative values of B segment: sHb, sSb, and sVb
The representative values of C segment: sHc, sSc, and sVc
The representative values of M segment: sHm, sSm, and sVm
The representative values of Y segment: sHy, sSy, and sVy The representative values can be obtained by averaging the respective HSV values included in each segment. Alternatively, the medium values of the respective HSV values can also be employed as the representative values.

Next, the ratio of each segment relative to the sample image is defined as follows:

The ratio of R segment relative to the sample image: sRateR
The ratio of G segment relative to the sample image: sRateG
The ratio of B segment relative to the sample image: sRateB
The ratio of C segment relative to the sample image: sRateC
The ratio of M segment relative to the sample image: sRateM
The ratio of Y segment relative to the sample image: sRateY In this case, the ratio of the R segment is obtained by the following equation. However, another equation can be employed for defining the representative values.

$$sRateR = (\text{number of pixels included in } R \text{ segment}) \div (\text{number of all the pixels included in the sample image}).$$

Figure 6:
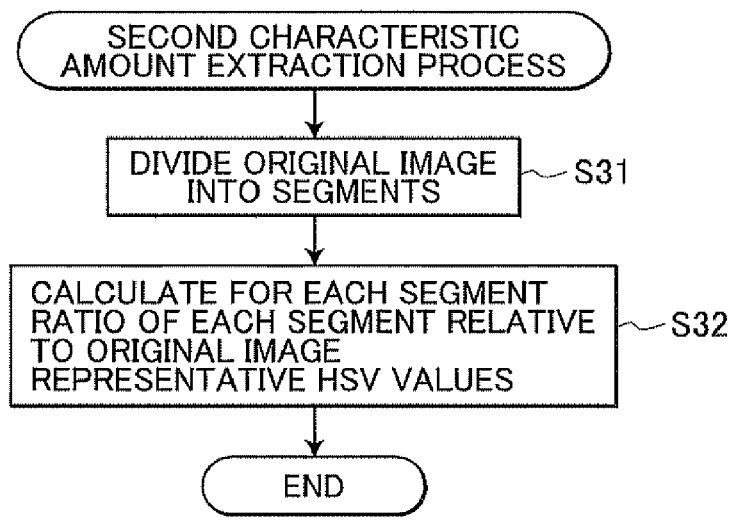
FIG. 6 is a flowchart showing a process extracting a second characteristic amount.

Next, the process of extracting the second characteristic amount shown as S15 of FIG. 4 is described with reference to FIG. 6. FIG. 6 is a flowchart showing the second characteristic amount extraction process.

In S31, the CPU 9 divides the original image into six segments. The details of the process are the same as in the process performed on the sample image, so the description thereof is omitted here.

In S32, the CPU 9 performs the same process as in S22 of FIG. 5 on the original image. The representative values (HSV values) of each segment are defined as follows:

The representative values of R segment: iHr iSr, and iVr
The representative values of G segment: iHg, iSg, and iVg
The representative values of B segment: iHb, iSb, and iVb
The representative values of C segment: iHc, iSc, and iVc
The representative values of M segment: iHm, iSm, and iVm
The representative values of Y segment: iHy, iSy, and iVy The ratio of each segment relative to the original image is defined as follows:

The ratio of R segment relative to the original image: iRateR
The ratio of G segment relative to the original image: iRateG
The ratio of B segment relative to the original image: iRateB
The ratio of C segment relative to the original image: iRateC
The ratio of M segment relative to the original image: iRateM
The ratio of Y segment relative to the original image; iRateY In the foregoing process, the algorithm for extracting the first characteristic amount and the algorithm for extracting the second characteristic amount are identical. However, different algorithms can be employed for extracting the first and second characteristic amounts.

Next, a detailed description is given for the process to be performed in S16 of FIG. 4, in which the CPU 9 converts the original image based on the first and second characteristic amounts. In this process, the CPU 9 converts the HSV values of each pixel included in the original image.

Figure 7:
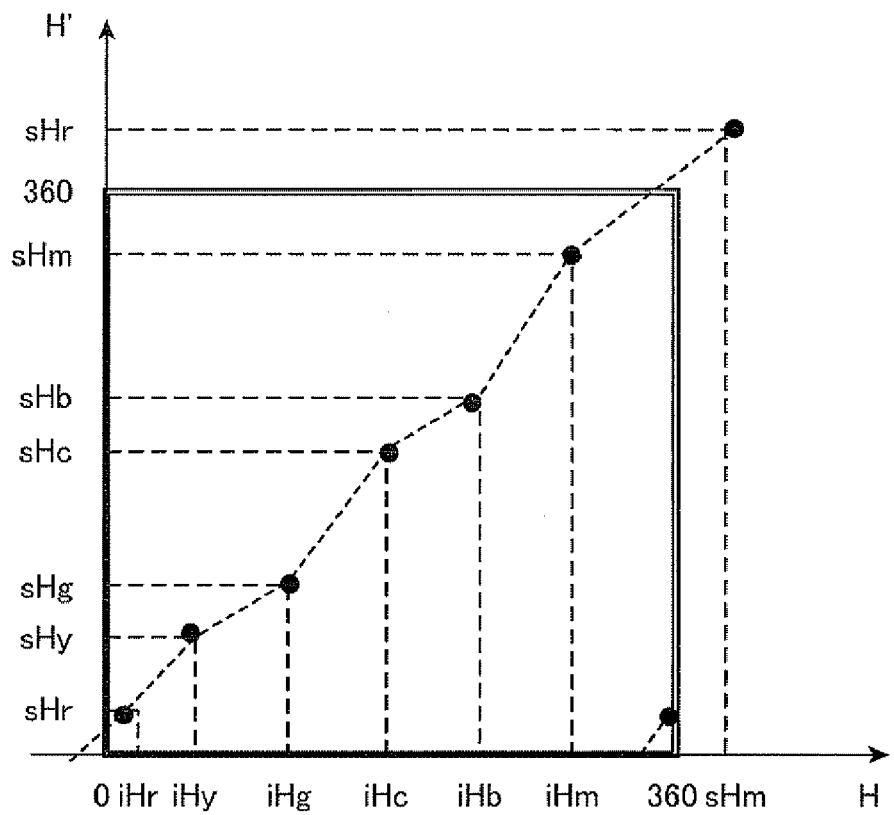
FIG. 7 shows a hue correction table.

First, the process of converting the H values is described. The representative H values of the original image should be read along the X-axis. The representative H values of the sample image should be read along the Y-axis. The representative H values are plotted for each segment. The plotted points are linear-interpolated so that the hue correction table shown in FIG. 7 is created. Where H'>360, H'=H'−360.

The CPU 9 applies each pixel of the original image to the hue correction table to correcting the H value of the pixel. Specifically, the corrected value H' is defined by the following equation $$H'=(y2-y1)/(x2-x1)*H-(y2-y1)/(x2-x1)*x2+y2 \quad \text{(equation 1)}$$

In this case, the expressions x1, x2, y1, and y2 are defined as follows.

Where H<iHr, $(x1,y1)=(iHm-360,sHm-360)$; and $(x2,y2)=(iHr,sHr)$

Where iHr<U<iHy, $(x1,y1)=(iHr,sHr)$; and $(x2,y2)=(iHy,sHy)$

Where iHy<H<iHg, $(x1,y1)=(iHy,sHy)$; and $(x2,y2)=(iHg,sHg)$.

Where iHg<H<iHc, $(x1,y1)=(iHg,sHg)$; and $(x2,y2)=(iHc,sHc)$.

Where iHc<H<iHb, $(x1,y1)=(iHc,sHc)$; and $(x2,y2)=(iHb,sHb)$.

Where iHb<H<iHm, $(x1,y1)=(iHb,sHb)$; and $(x2,y2)=(iHm,sHm)$.

Where iHm<H, $(x1,y1)=(iHr,sHm)$; and $(x2,y2)=(iHr+360,sHr+360)$.

Next, the process of converting the S and V values is described. The CPU 9 converts the S and V values for the respective segments divided based on the H values. For example, the S and V values in the R segment are obtained by the following equations.

Where S<iSr, $$S'=S\times(sSr\div iSn). \quad \text{(Equation 2)}$$

Where S>iSr, $$S'=1\div(S-1)\times\{(1-sSr)\div(1-iSr)\}. \quad \text{(Equation 3)}$$

Where V<iVr, $$V'=V\times(sVr\div iVr). \quad \text{(Equation 4)}$$

Where V>iVr, $$V'=1+(V-1)\times((1-sVr\div(1-iVr)). \quad \text{(Equation 5)}$$

The S and V values can also be calculated for the other segments. Hereinafter, the conversion table defined by the S-value conversion equations is referred to as a "saturation correction table. The conversion table defined by the V-value conversion equations is referred to as a "brightness correction table.

After that, the CPU 9 further converts the converted HSV values into a format supported by the printing unit 10 (for example, RGB values). The technique of converting RSV values into RGB values has been described, so the description thereof is omitted here.

In the foregoing color conversion process, the CPU 9 converts the color tones of the original image into the color tones of the sample image for each segment divided based on the H values.

Second Embodiment

In the second embodiment, the CPU 9 avoids performing a part of the color conversion process on each of the divided segments according to the segment size. The CPU 9 also controls the amount of change to be made when the color conversion process is partially performed. In the second embodiment, the user can reflect only desired color tones of the sample image on the original image.

Figure 8:
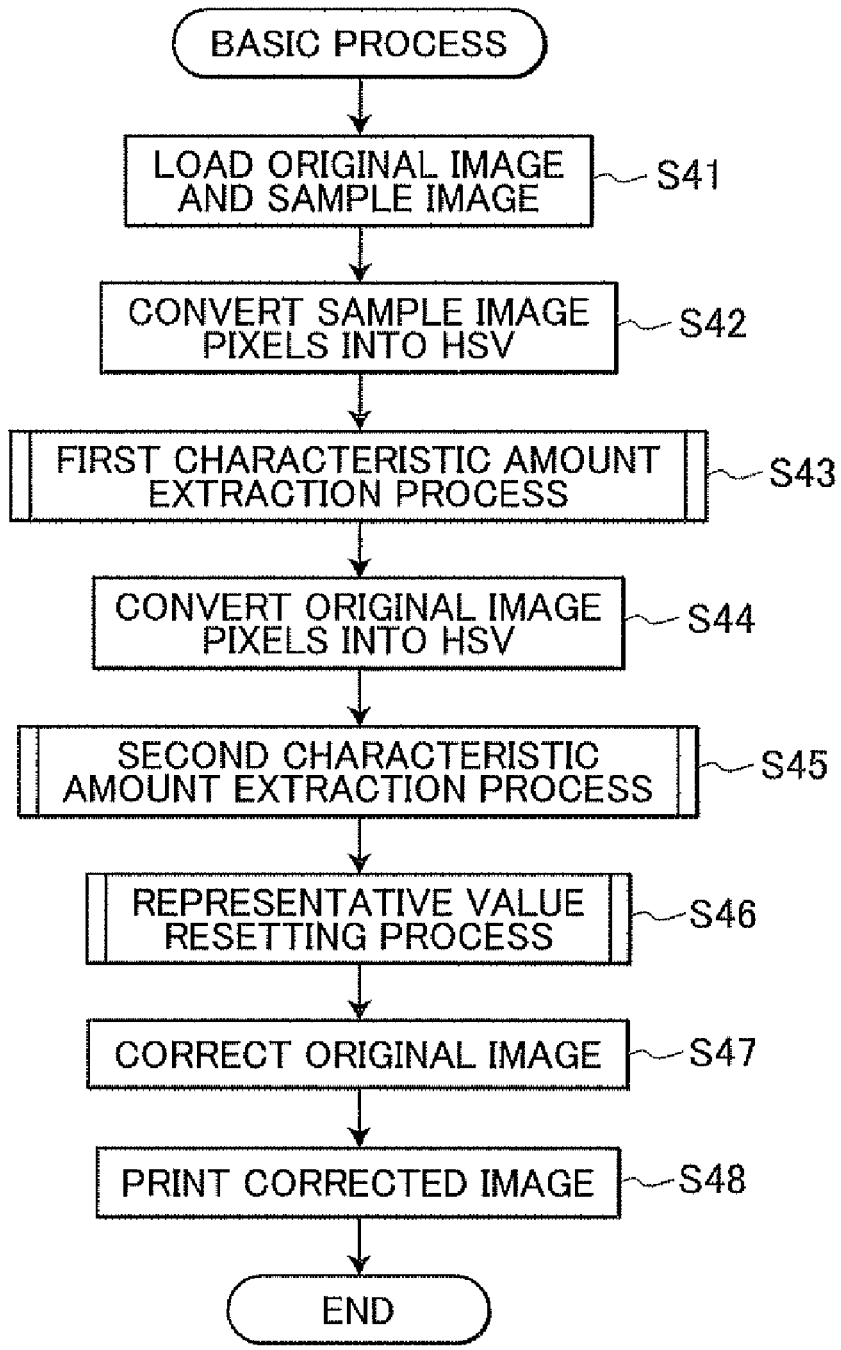
FIG. 8 is a flowchart showing a color conversion process according to a second embodiment.

FIG. 8 is a flowchart showing a basic process according to this embodiment. Although the flow of the basic process according to this embodiment is the same as in FIG. 4, a representative value resetting process (S46) is added after the second characteristic amount extraction process. Hereinafter, the representative value resetting process is described with reference to the drawing.

Figure 9:
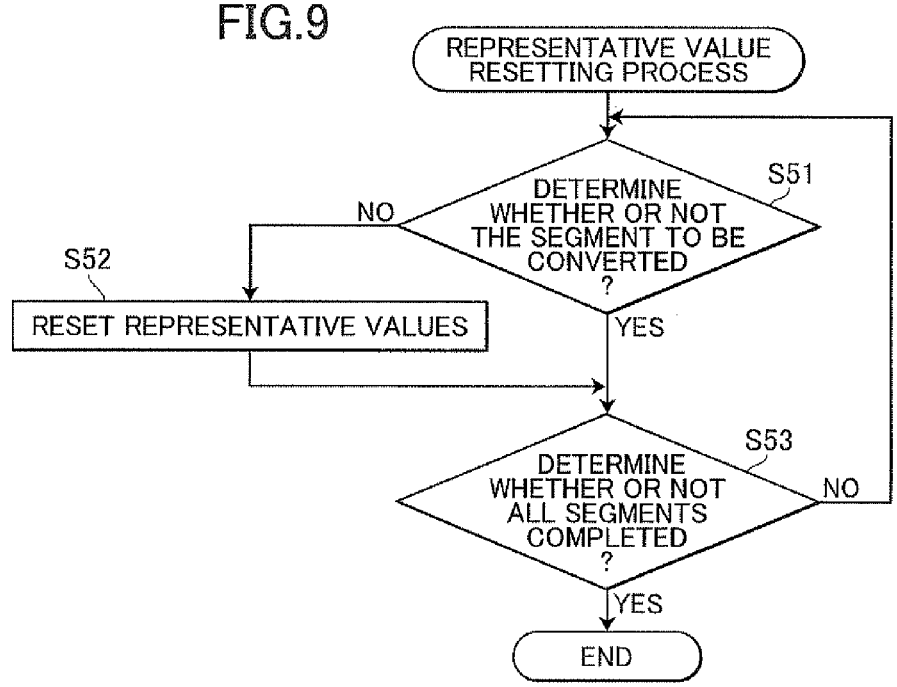
FIG. 9 is a flowchart showing a representative value resetting process.

FIG. 9 is a flowchart showing the representative value resetting process according to this embodiment. In S51, the CPU 9 determines whether or not a given segment has to be converted. In this step, the CPU 9 determines whether or not each segment satisfies predetermined conditions.

If the CPU 9 determines that the segment has to be converted (S51: YES), the CPU 9 proceeds to S53. If the CPU 9 determines that the segment does not have to be converted (S51; NO), the CPU 9 proceeds to S52. In S52, the CPU 9 resets the representative values, and then proceeds to S53. The method of resetting the representative values is described later in detail.

In S53, the CPU 9 determines whether or not the conversion determination has been performed for all the segments (six segments if divided into six). If the conversion determination has not been performed for any other segment (S53: NO), the CPU 9 returns to S51 to repeat the steps thereafter. If the CPU 9 completes the conversion determination for all the segments (S53; YES), the CPU 9 exits the representative value resetting process.

[Method by Employing Threshold Value Thre]

As the aforementioned predetermined conditions, the magnitude relation between the size of each segment and a threshold value "THre" can be employed. If a given segment occupies the original image or the sample image at a ratio smaller than the threshold value Thre, the CPU 9 determines that a given segment has to be converted, and changes the original image and the sample image to have the same representative values. The CPU 9 employs the changed representative values to perform the foregoing conversion process for each pixel. The process is hereinafter described. The representative values are reset as follows.

Where sRateR<Thre, or iRateR<Thre, $sHr=0, sSr=0.5, sVr=0.5$; and $iHr=0, iSr=0.5, iVr=0.5$.

Where sRateG<Thre, or iRateG<Thre, $sHg=120, sSg=0.5, svg=0.5$; and $iHg=120, iSg=0.5, iVg=0.5$.

Where sRateB<Thr or iRateB<Thre, $sHb=240, sSb=0.5, sVb=0.5$; and $iHb=240, iSc=0.5, iVb=0.5$, Where sRateC<Thre, or iRateC<Thre, $sHc=180, sSc=0.5, sfc=0.5$; and $iHc=180, iSc=0.5, iVc=0.5$, Where sRateM<Thre, or iRateM<Thre, $sHm=300, sSm=0.5, sVm=0.5$; and $iHm=300, iSm=0.5, iVm=0.5$.

Where sRateY<Thre, or iRateY<Thre, $sHy=60, sSy=0.5, sVy=0.5$; and $iHy=60, iSy=0.5, iVy=0.5$.

In this example, 0.5 is employed as the S and V values. The number 0.5 is the medium value of the values between which the S and V values may take (from 0 to 1). As the H values, the medium value is employed for each segment. However, the present invention is not limited to these values.

In addition to these values, the aforementioned conversion equations (Equation 2 to 5) are employed so that the CPU 9 makes a conversion for each pixel. In this case, the CPU 9 does not change S and V values. Specifically, where S<iSr for R segment, the CPU 9 calculates S value based on Equation 2.

$$S'=S\times(sSr \div iSr)$$

Since sSr=0.5 and iSr=0.5, these values are assigned to the equation, thereby resulting in the following equation.

$$S'=S\times(0.5 \div 0.5)=S \quad \text{(Equation 6)}$$

Where S>iSr, S'=S in the same way. Similarly, the CPU 9 changes neither the V values nor the values of the other segments.

Thus, if a given segment occupies the original image or the sample image at a ratio equal to or greater than the threshold value Thre, the CPU 9 changes the representative values of the original image and the sample image by employing the aforementioned conversion equations 1 to 5, and if a given segment occupies the original image or the sample image at a ratio smaller than the threshold value Thre, the CPU 9 changes the representative values of the original image and the sample image to predetermined values, and employs the changed representative values to perform the foregoing conversion process for each pixel. If a given segment occupies the original image or the sample image at a ratio equal to or greater than the threshold value Thre, and segments adjacent to the given segment occupies the original image or the sample image at a ratio smaller than the threshold value Thre, the dimension of the triangle defined by the changed representative values of the given segment and the adjacent segments is reduced. Thus, since the influence from adjacent segments to the given segment is reduced, the conversion amount becomes smaller.

Next, the method of deciding the threshold value Thre is described. This value can be decided by sensory evaluation. Based on sensory evaluation, the present inventor has found that a segment occupying the image approximately at a percentage of 6% or larger is easily perceived. Therefore, 6% can be employed as the threshold value Thre. However, the present invention is not limited to the threshold value Thre 6%.

Furthermore, the threshold value Thre can be decided so that the CPU 9 extracts the segment of which size is relatively larger than the sizes of the other segments. For example, if the number of the divided segments is six, its reciprocal "⅙" can be employed as the threshold value Thre.

The number of divided segments "six" is calculated by excluding black and white as achromatic colors, from the eight vertices in mom space as a color gamut for representing colors. In order that human eyes discriminate one color from another, six vertices are sufficient in a color gamut. If the color gamut has vertices less than six, human eyes are likely to recognize that the original image does not have color tones similar to those of the sample image in spite of the conversion process. On the other hand, if each image is divided into segments more than six, the conversion accuracy is improved. However, human eyes tend not to recognize the improved accuracy. Furthermore, the amount to be calculated increases as the division number of segments increases. This means that the CPU requires a longer time to obtain the image to be corrected as a result printed by a printer, thereby causing the discontent of the user with the printer. This is why the segment division number six is employed.

In the foregoing example, the same threshold value is employed for all the segments. However, the threshold value Thre can be converted for each segment.

[Method by Employing Largest Segment Information]

In the foregoing method, the threshold value Thre is set to convert the representative values based on the threshold value for avoiding performing a part of the color conversion process and for decreasing the conversion amount. Hereinafter, a description is given for another color conversion process in which largest segment information is employed for reflect only a specific color of the sample image on the original image.

In this method, in S51 of FIG. 9, whether or not a given segment has the largest size both in the original image and in the sample image, can be included in the predetermined conditions. In this method, the CPU 9 resets the representative values according to the following equations. Hereinafter, out of the segments of the sample image, the ratio of the segment which has the largest share in the sample image is defined as sMaxRate. Out of the segments of the original image, the ratio of the segment which has the largest share in the original image is defined as iMaxRate.

Where sRateR≠sMaxate, or iRateR≠iMaxRate, $sHr=0, sSr=0.5, sVr=0.5$; and $iHr=0, iSr=0.5, iVr=0.5$.

Where sRateG≠sMaxRate, or iRateG≠iMaxRate, $sHg=120, sSg=0.5, sVg=0.5$; and $iHg=120, iSg=0.5, iVg=0.5$.

Where sRateB≠sMaxRate, or iRateB≠iMaxRate, $sHb=240, sSb=0.5, sVb=0.5$; and $iHb=240, iSb=0.5, iVb=0.5$.

Where sRateC≠sMaxRate, or iRateC≠iMaxRate, $sHc=120, sSc=0.5, sVc=0.5$; and $iHc=120, iSc=0.5, iVc=0.5$.

Where sRateM≠sMaxRate, or iRateM≠iMaxRate, $sHm=300, sSm=0.5, sVm=0.5$; and $iHm=300, iSm=0.5, iVm=0.5$.

Where sRateY≠sMaxRate, or iRateY≠iMaxRate, $sHy=60, sSy=0.5, sVy=0.5$; and $iHy=60, iSy=0.5, iVy=0.5$.

The CPU 9 makes a conversion only for the segment which has the largest share both in the original image and the sample image. For the other segments, the CPU 9 does not convert the S and V values thereof. The conversion amounts of the H values can be reduced since the influence from adjacent segments to the given segment is reduced, the conversion amount becomes smaller.

Figure 10:
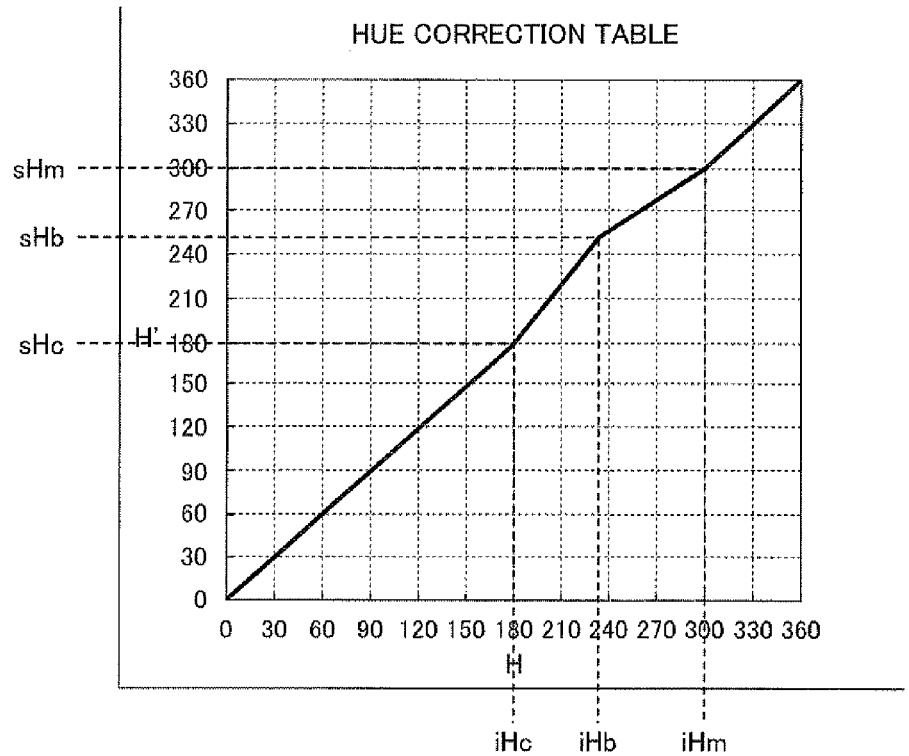
FIG. 10 shows a hue correction table.

In the case where the CPU 9 makes a conversion only for the B segment, the hue correction table shown in FIG. 10 is created. In the hue correction table, the representative H values of the C segment next to the B segment on the color space (iHc=180, sHc=180) are connected by straight line with the representative H values of the B segment (nHb, sHb). Similarly, the representative H values of the M segment next to the B segment on the color space (nHm=300, sHm=300) are connected by straight line with the representative H values of the B segment (nHb, sHb).

Therefore, the CPU 9 makes a conversion also for the C segment having H values of 180<H<210, and for the M segment having H values of 270<H<300. The conversion amounts become larger as closer to the B segment.

As stated above, in the second embodiment, for which segment the CPU 9 makes a conversion, can be selected. For the other segments, the H values next to the selected segment on the color space are partially converted. This method prevents a false contour (tone jumps) from appearing between the segment to be converted and the other segments.

Third Embodiment

In the second embodiment, although the conversion amounts of the H values of the segments which not to be converted, can be reduced, but the conversion amount cannot be zero. As shown in FIG. 7, the H values of the segment which is converted are linear-interpolated with the representative values of the segment which is not converted, so that the H values are affected by the representative values of the other segments.

Figure 11:
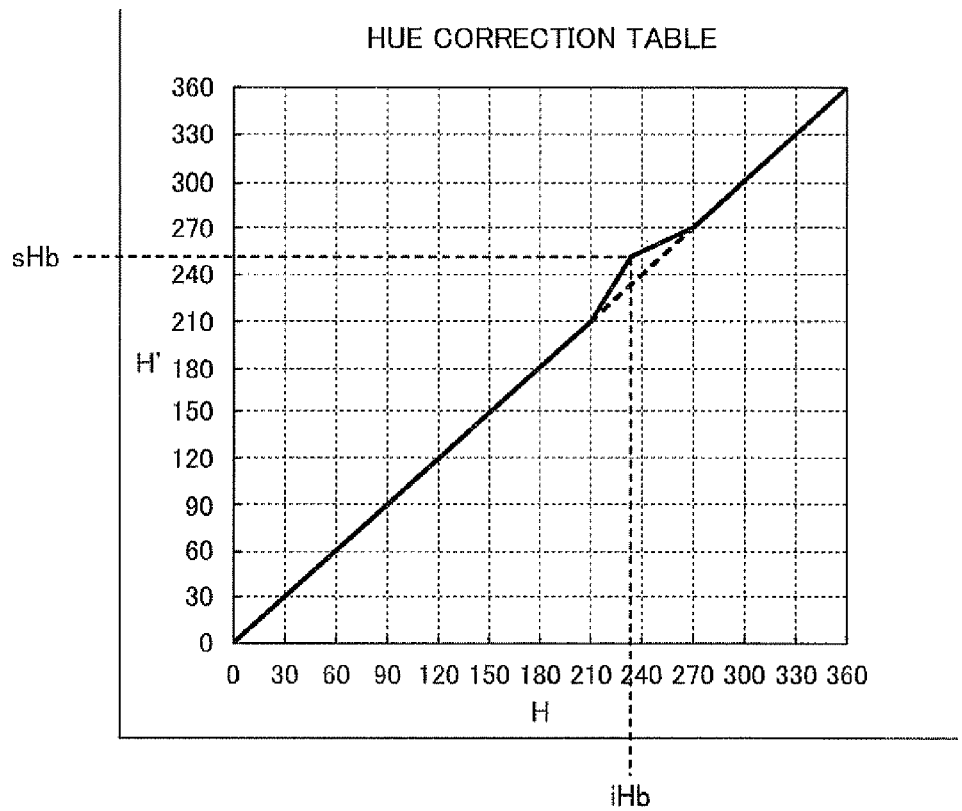
FIG. 11 shows another hue correction table.

Accordingly, the hue correction table shown in FIG. 11 is employed FIG. 11 shows the hue correction table for a case in which only the B segment is to be converted. Although this figure is base on the case in which only one segment is converted, a plural number of segments can be corrected.

In FIG. 11, for the H values of the segments except the B segment, H'=H. No color conversion is made therefore. The H' value of the B segment is obtained based on the following equations, if the smallest value in the B segment is defined as Hmin, and the largest value therein as Hmax.

Where H<iH, $H'=H\min+(sHb-H\min)*(H-H\min)\div(iHb-H\min)$.

Where H>iH, $H'=sHb+(H\max-sHb)*(H-iHb)\div(H\max-iHb)$.

These equations are employed so that the CPU 9 makes a conversion only for the segment to be converted.

As stated above, in the third embodiment, the CPU 9 makes a conversion only for the H values to be converted. This makes the color conversion more effective.

Fourth Embodiment

Figure 12:
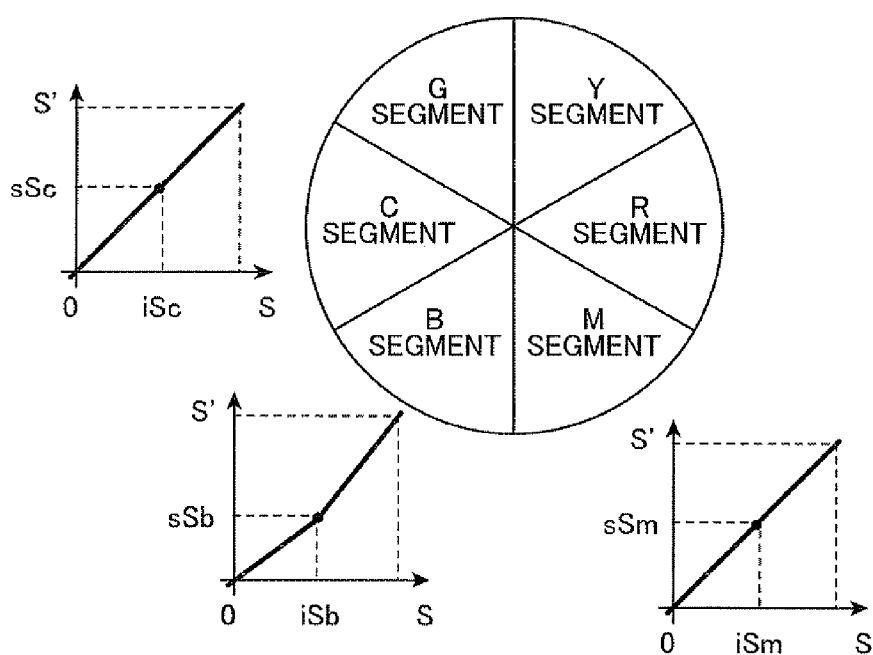
FIG. 12 shows a saturation correction table.

In the second embodiment, independent correction curves (conversion equations) are employed for the S and V values of each segment, thereby causing a false contour (tone jumps). Specifically, as shown in FIG. 12, a table showing the relation between S and S' is provided for each segment. This means that no consideration is given to the characteristics of the tables of the segments adjacent to each other.

Figure 13:
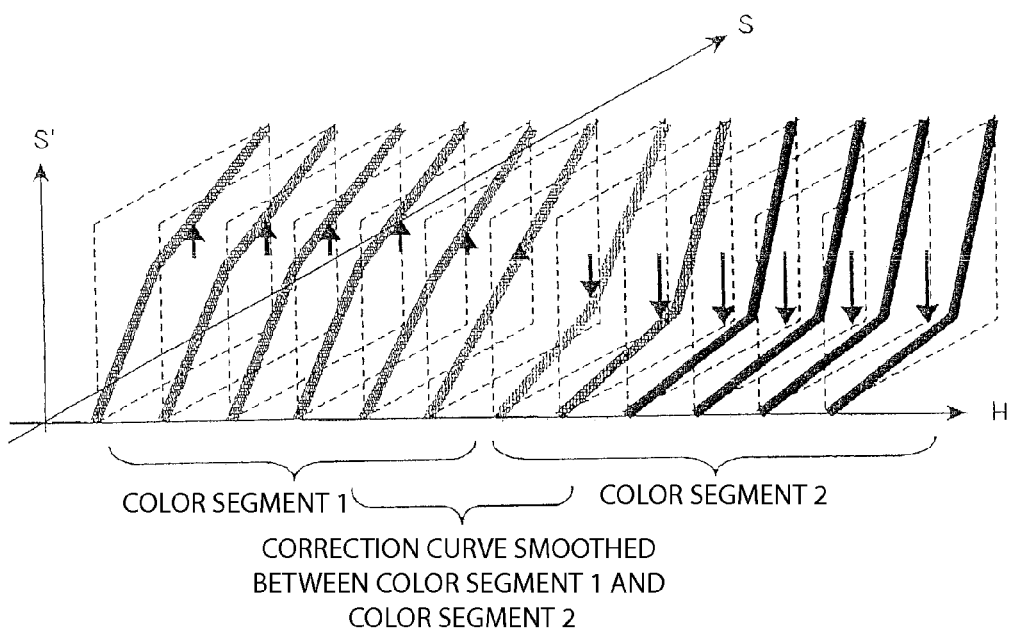
FIG. 13 shows changes in saturation correction curves.

In this embodiment, as shown in FIG. 13, the correction curve of each color segment is smoothed to prevent tone jumps.

Figure 14:
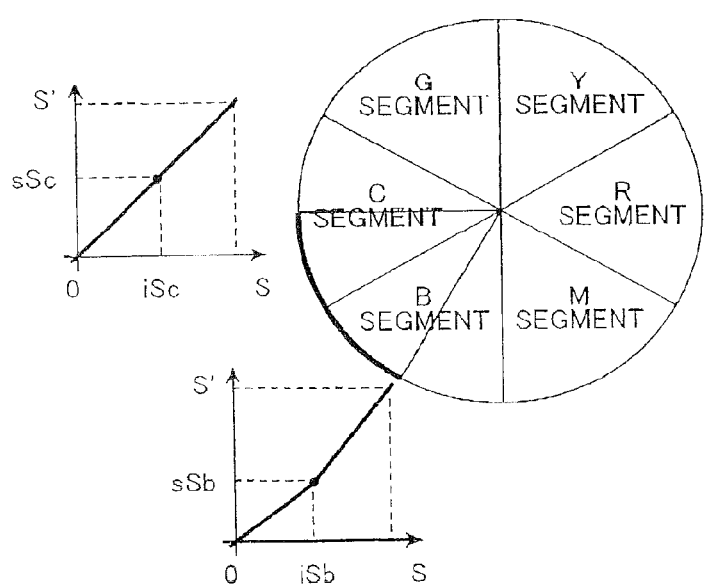
FIG. 14 shows another saturation correction table for B and C segments.

Hereinafter, a specific prowess according to this embodiment is described. Referring to FIGS. 14 and 15, a description is given for a case in which the CPU performs a color conversion process on a part of the C segment and on a part of the B segment. For the other segments, the CPU performs the process basically in the same manner.

In order to obtain the corrected S value (Sb") according to this embodiment, the following values are employed: each H value of the segment to be converted (H); the medium value of the H values of the segment to be converted (Hbmid); the representative H value of the segment positioned along the hue-axis closer to the H value of the pixel to be converted, and far from the medium value of the H values of the segment to be converted (Hcmid); each S value of the segment to be converted, obtained by the conversion equation corresponding to Equation 2 (specifically, calculated based on the saturation correction table of the B segment) (Sb'); and each S value of the adjacent segment, obtained by the conversion equation corresponding to Equation 3 (specifically, calculated based on the saturation correction table of the C segment) (Sc'). The corrected S values (Sb") according to this embodiment are obtained by the following equation.

$$Sb''=\{(H-Hcmid)*Sb'+(Hbmid-H)*Sc'\}/\{(Hbmid-Hcmid)\}$$ (Equation 7)

Note that the values Hbmid and Hcmid correspond to the reset representative values. In order to obtain the corrected V values (Vb") according to this embodiment, the following values are employed: each H value of the segment to be converted (H); the representative H value of the segment to be converted (Hbmid); the representative H value of the adjacent segment (Hcmid); each V value of the segment to be converted, obtained by the conversion equation corresponding to Equation 4 (specifically, calculated by the brightness correction table of the B segment (Vb'); and each S value of the adjacent segments obtained by the conversion equation corresponding to Equation 5 (specifically, calculated based on the brightness correction table of the C segment (Vc'). The corrected V values (Vb") according to this embodiment are obtained by the following equation.

$$Vb''=((H-Hcmid)*Vb'+(Hbmid-H)*Vc')/\{(Hbmid-Hcmid)\}$$ (Equation 8)

The CPU performs the process on a part of the B segment (H value range: 210<H<240) and on the part of the C segment (H value range; 180<H<210) as shown in FIG. 16. Weights are assigned according to the inputted hue values (H) so as to obtain the saturation values (S") and the brightness values (V") for output. This process can smooth the correction effect between the hues.

As stated above, in the present invention, color conversion is made so that the image inputted from a storage medium has the same characteristics as the image inputted by the scanner. This allows the user to make color conversion with simple operation in a visual form.

For example, if the user desires to make the conversion of an original image including a building and a blue sky so that the blue becomes more vivid like a blue sea, the user scans a photograph including a vividly blue sea by the scanner as a sample image. This operation makes the blue included in the original image become vivid sea blue.

Furthermore, if the user desires to make the conversion of an image including a human face so that the face has a blight color, the user scans a photograph including a palm of a hand or the like having a blight color, by the scanner. This operation makes the face color included in the original image become blight.

The user neither has to input any parameter nor has to be knowledgeable about image processing. For the desired color conversion, the user has only to scan an image to be employed for its color sample. Furthermore, since the segment to be color-converted can be automatically selected, the user can convert only a noticeable segment. For an unnoticeable segment, the user can avoid conversion or can perform conversion moderately.

Although the present invention has been described with respect to specific embodiments, it will be appreciated by one skilled in the art that a variety of changes may be made without departing from the scope of the invention. For example, instead of reading a sample image by the scanner, the CPU can read an image from a storage medium as a sample image. Furthermore, instead of reading an original image from a storage medium, the CPU can load an original image through the scanner.

Furthermore, the present invention can be implemented as an image-printing method of performing the foregoing processes. The present invention can also be implemented as a computer program for performing the image-printing method, or as a recording medium which stores the program.

What is claimed is:

1. An image-printing device comprising:
   a reading unit configured to read a sample image and an original image;
   a sample characteristic amount extracting unit configured to categorize all pixels of the sample image into respective sample segments based on respective hue ranges, and calculate a sample characteristic amount for each of the respective sample segments;
   an original characteristic amount extracting unit configured to categorize all pixels of the original image into respective original segments-corresponding to the respective hue ranges of the respective sample segments, and calculate an original characteristic amount for each of the respective original segments;
   an image converting unit configured to convert pixels of a selected original segment of the respective original segments based on both the sample characteristic amount of a sample segment corresponding to the selected original segment and the original characteristic amount of the selected original segment; and
   a printing unit configured to print the converted original image.

2. The image-printing device according to claim 1, wherein the sample characteristic amount extracting unit extracts a sample characteristic amount other than the hue from each sample segment, and
   wherein the original characteristic amount extracting unit extracts an original characteristic amount other than the hue from each original segment.

3. The image-printing device according to claim 2, wherein the sample characteristic amount other than the hue includes a sample saturation and a sample brightness, the original characteristic amount other than the hue includes an original saturation and an original brightness.

4. The image-printing device according to claim 2, wherein the sample characteristic amount extracting unit characterizes the sample image into six segments, and the original characteristic amount extracting unit characterizes the original image into six segments.

5. The image-printing device according to claim 2, further comprising:
   a representative value determining unit configured to determine first sample representative values of the sample hue for each sample segment, second sample representative values of the sample characteristic amount other than the hue for each sample segment, first original representative values of the original hue for each original segment, second original representative values of the original characteristic amount other than the hue for each original segment; and
   a characteristic amount converting unit configured to convert the original hue based on both the first sample representative value and the first original representative value, and convert the original characteristic amount other than the hue based on both the second sample representative value and the second original representative value, wherein the image converting unit converts the original image based on both the converted original hue and the converted original characteristic amount other than the hue.

6. The image-printing device according to claim 2, further comprising a characteristic amount converting unit configured to convert the sample hue of a small segment having a dimension that is smaller than a predetermined dimension and the original hue of the small segment so that a converting amount converted by the image converting unit decreases, without converting the sample characteristic amount other than the hue of the small segment and the original characteristic amount other than the hue of the small segment.

7. The image-printing device according to claim 1, further comprising a characteristic amount converting unit configured to fail to convert the original characteristic amount and the sample characteristic amount of a small segment having a dimension that is smaller than a predetermined dimension.

8. The image-printing device according to claim 1, further comprising a characteristic amount converting unit configured to convert only the sample characteristic amount of a segment that is largest among the respective sample segments and the original characteristic amount of a segment that is largest among the respective original segments.

9. An image-printing method of correcting an original image for printing comprising:
(a) reading a sample image and an original image;
(b) categorizing all pixels of the sample image into respective sample segments based on respective hue ranges, and calculating a sample characteristic amount for each of the respective sample segments;
(c) categorizing all pixels of the original image into respective original segments-corresponding to the respective hue ranges of the respective sample segments, and calculating an original characteristic amount for each of the respective original segments;
(d) converting pixels of a selected original segment of the respective original segments based on both the sample characteristic amount of a sample segment corresponding to the selected original segment and the original characteristic amount of the selected original segment; and
(e) printing the converted original image.

10. The image-printing method according to claim 9, wherein step (b) calculates a sample characteristic amount other than the hue from each sample segment, and
wherein step (c) calculates an original characteristic amount other than the hue from each original segment.

11. The image-printing method according to claim 10, wherein the sample characteristic amount other than the hue includes a sample saturation and a sample brightness, the original characteristic amount other than the hue includes an original saturation and an original brightness.

12. The image-printing method according to claim 10, wherein step (b) characterizes the sample image into six segments, and step (c) characterizes the original image into six segments.

13. The image-printing method according to claim 10, further comprising:
(f) determining first sample representative values of the sample hue for each sample segment, second sample representative values of the sample characteristic amount other than the hue for each sample segment, first original representative values of the original hue for each original segment, second original representative values of the original characteristic amount other than the hue for each original segment; and
(g) converting the original hue based on both the first sample representative value and the first original representative value and converting the original characteristic amount other than the hue based on both the second sample representative value and the second original representative value, wherein the converting (d) converts the original image based on both the converted original hue and the converted original characteristic amount other than the hue.

14. The image-printing method according to claim 10, further comprising (g) converting the sample hue of a small segment having a dimension that is smaller than a predetermined dimension and the original hue of the small segment so that a converting amount converted by the image converting unit decreases, without converting the sample characteristic amount other than the hue of the small segment and the original characteristic amount other than the hue of the small segment.

15. The image-printing method according to claim 9, further comprising (h) failing to convert the original characteristic amount and the sample characteristic amount of a small segment having a dimension that is smaller than a predetermined dimension.

16. The image-printing method according to claim 9, further comprising (i) converting only the sample characteristic amount of a segment that is largest among the respective sample segments and the original characteristic amount of a segment that is largest among the respective original segments.

17. A non-transitory computer readable medium storing an images printing program executable by a computer for performing the steps comprising:
(a) reading a sample image and an original image;
(b) categorizing all pixels of the sample image into respective sample segments based on respective hue ranges, and calculating a sample characteristic amount for each of the respective sample segments;
(c) categorizing all pixels of the original image into respective original segments corresponding to the respective hue ranges of the respective sample segments, and calculating an original characteristic amount for each of the respective original segments;
(d) converting pixels of a selected original segment of the respective original segments based on both the sample characteristic amount of a sample segment corresponding to the selected original segment and the original characteristic amount of the selected original segment; and
(e) printing the converted original image.

18. The non-transitory computer readable medium according to claim 17, wherein step (b) calculates a sample characteristic amount other than the hue from each sample segment, and
wherein step (c) calculates an original characteristic amount other than the hue from each original segment.

19. The computer readable medium according to claim 18, wherein the sample characteristic amount other than the hue includes a sample saturation and a sample brightness, the original characteristic amount other than the hue includes an original saturation and an original brightness.

20. The non-transitory computer readable medium according to claim 18, wherein step (b) characterizes the sample image into six segments, and step (c) characterizes the original image into six segments.

21. The non-transitory computer readable medium according to claim 18, further comprising:
- (f) determining first sample representative values of the sample hue for each sample segment, second sample representative values of the sample characteristic amount other than the hue for each sample segment, first original representative values of the original hue for each original segment, second original representative values of the original characteristic amount other than the hue for each is original segment; and
- (g) converting the original hue based on both the first sample representative value and the first original representative value, and converting the original characteristic amount other than the hue based on both the second sample representative value and the second original representative value, wherein the converting (d) converts the original image based on both the converted original hue and the converted original characteristic amount other than the hue.

22. The non-transitory computer readable medium according to claim 18, further comprising (g) converting the sample hue of a small segment having a dimension that is smaller than a predetermined dimension and the original hue of the small segment so that a converting amount converted by the image converting unit decreases, without converting the sample characteristic amount other than the hue of the small segment and the original characteristic amount other than the hue of the small segment.

23. The non-transitory computer readable medium according to claim 17, further comprising (h) failing to convert the sample characteristic amount of a small segment having a dimension that is smaller than a predetermined dimension, and the original characteristic amount of the small segment.

24. The non-transitory computer readable medium according to claim 17, further comprising (i) converting only the sample characteristic amount of a segment that is largest among the respective sample segments and the original characteristic amount of a segment that is largest among the respective original segments.

* * * * *